F. BUCK.
LEVEL RULE.
APPLICATION FILED JUNE 8, 1914.
1,120,443.
Patented Dec. 8, 1914.
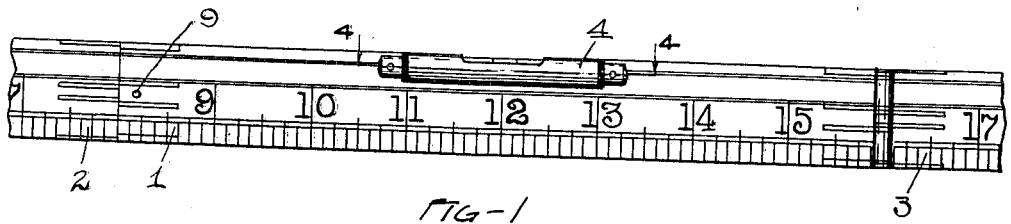
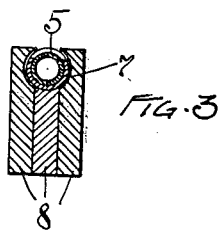
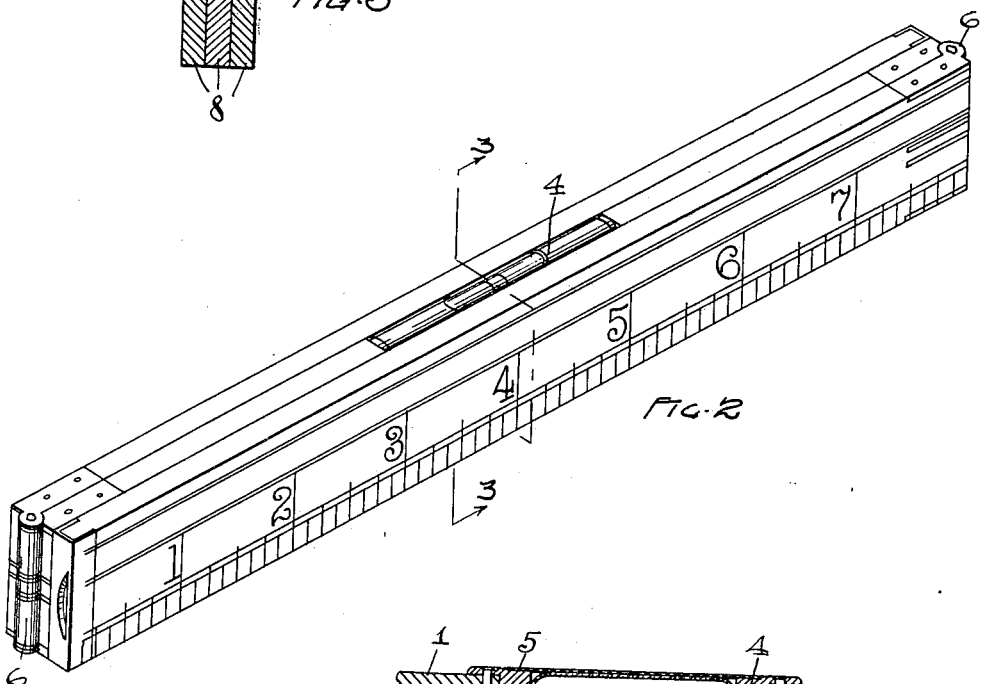
WITNESSES
O. M. Kappler
H. B. Fay
INVENTOR
Fred Buck
BY Fay & Oberlin
ATTORNEYS

UNITED STATES PATENT OFFICE.

FRED BUCK, OF SAGINAW, MICHIGAN, ASSIGNOR TO THE LUFKIN RULE COMPANY, OF SAGINAW, MICHIGAN, A CORPORATION OF MICHIGAN.

LEVEL-RULE.

1,120,443. Specification of Letters Patent. Patented Dec. 8, 1914.

Application filed June 8, 1914. Serial No. 843,608.

*To all whom it may concern:*

Be it known that I, FRED BUCK, a citizen of the United States, and a resident of Saginaw, county of Saginaw, and State of Michigan, have invented a new and useful Improvement in Level-Rules, of which the following is a specification, the principle of the invention being herein explained and the best mode in which I have contemplated applying that principle, so as to distinguish it from other inventions.

My invention relates to a level rule, and comprises a foldable rule in which I provide a leveling tube, the rule being so constructed that not only is the tube protected from injury, but also the level is permitted to indicate accurately the condition of the surface upon which the rule is placed, this result being secured by the broad base formed by the rule when folded.

An additional feature of importance is the provision of recesses in the portions of the rule adjacent to the part bearing the level, which coöperate with the extending sides of the level to guide such adjacent portions into their proper position with respect to the central part and to partially inclose the leveling tube thus protecting the same against injury.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—Figure 1 is a side elevation of my improved rule; Fig. 2 is a perspective view of the same when folded; Fig. 3 is a transverse section through the rule and level on the line 3—3 in Fig. 2; and Fig. 4 is a horizontal section through the leveling tube and rule on the line 4—4 in Fig. 1.

Referring now to Fig. 1, the measuring rule will be seen to comprise a plurality of sections 1, 2 and 3, preferably of equal length, and foldably connected to each other. The rule may be suitably marked upon either side to indicate the desired graduations for the purpose of measurement. Centrally in the top of the section 1 I inset a leveling tube 4, the top of which is on a level with the top of such section, although the sides 5 of such tube project laterally beyond the sides of the section 1 of the rule.

The sections 2 and 3 which are foldably attached to either end of the first-named section 1, are so attached by means of hinges 6 which permit such sections to fold over in contact with each side of the central section 1. Each of such two folding sections is provided with a semi-cylindrical recess adjacent to its upper edge, adapted to receive and snugly inclose the projecting portions 5 of the leveling tube 4. The tube is thus protected from injury when the rule is folded, and the latter may be folded into such a position that the adjacent sections are in contact with each other. The hinges are so constructed that the sections will fold together with their bottom surfaces 8 on the same level, (see Fig. 3), and guide-pins 9 are provided at opposite ends and on opposite sides of the central section 1 for the engagement in suitably formed recesses on the adjacent sections 2 and 3. These guide-pins 9 coöperate with the projecting sides of the leveling tube and the recesses in the adjacent section, to cause such sections to have a continuous smooth lower surface when the sections are folded, thus providing a broad, substantial base for the leveling tube. Such a base is desirable, and is in fact necessary, if accurate use is to be made of the level, and in the present construction this is adequately secured by the particular formation and attachment of the adjacent sections of the rule.

In this construction I have secured a compact and serviceable level rule, and one which combines the functions of a pocket level with those of a folding rule without in anyway detracting from the usefulness of either. Furthermore the rule is so constructed that it amply protects the level tube and coöperates with the same to afford a broad substantial base for the device when used as a level.

The level tube may be conveniently and securely fastened to the rule, section 1, in the manner illustrated in Fig. 4.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a rule, the combination of a plurality of hinged sections, and a cylindrical leveling tube set into the top of one of the intermediate sections, said tube being greater in diameter than the width of said section and thereby projecting laterally beyond said section on each side, the sections on each end of said intermediate section being foldable into parallel relation therewith, thereby providing a relatively broad substantial base for said leveling tube, said last-named sections being provided with recesses adapted to snugly receive the projecting sides of said tube when said sections are in such parallel relation.

2. In a rule, the combination of three hinged sections, and a cylindrical leveling tube set into the top of the central section and flush with the upper surface thereof, said tube being greater in diameter than the width of said section and thereby projecting laterally beyond said section on each side, the sections on each end of said first-named section being foldable into parallel relation therewith, one of said last-named sections being in contact with one side of said first-named section, and the other with the other side thereof, each end-section being provided with a semi-cylindrical recess adapted to snugly receive the projecting sides of said tube when said sections are in such parallel contacting relation, such projecting sides of said tube serving, in coöperation with such recesses in said last-named sections, to guide the latter into accurately parallel relation with said first-named section, whereby the bottoms of all said sections are brought into the same plane and serve as a broad, substantial base for said leveling tube.

Signed by me, this 4th day of June, 1914.

FRED BUCK.

Attested by:
NORMAN A. ELLIS,
GEORGE C. MCBETH.